US010612357B2

(12) United States Patent
Babcock et al.

(10) Patent No.: US 10,612,357 B2
(45) Date of Patent: Apr. 7, 2020

(54) Y-GRADE NGL RECOVERY

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US)

(73) Assignee: Linde Aktiengesellschaft, Munich (DE)

( * ) Notice: Subject to any disclaimer, the term of this patent is extended or adjusted under 35 U.S.C. 154(b) by 164 days.

(21) Appl. No.: 15/356,846

(22) Filed: Nov. 21, 2016

(65) Prior Publication Data

US 2017/0218742 A1 Aug. 3, 2017

Related U.S. Application Data

(60) Provisional application No. 62/319,877, filed on Apr. 8, 2016, provisional application No. 62/289,722, filed on Feb. 1, 2016.

(51) Int. Cl.
| *E21B 43/34* | (2006.01) |
| *E21B 43/40* | (2006.01) |
| *B01D 19/00* | (2006.01) |
| *B01D 17/02* | (2006.01) |
| *C10G 5/06* | (2006.01) |

(52) U.S. Cl.
CPC .......... *E21B 43/34* (2013.01); *B01D 17/0208* (2013.01); *B01D 19/0036* (2013.01); *B01D 19/0068* (2013.01); *C10G 5/06* (2013.01); *E21B 43/40* (2013.01)

(58) Field of Classification Search
CPC .......... E21B 43/34; E21B 43/40; C10G 5/06; B01D 17/0208; B01D 19/0036; B01D 19/0068
See application file for complete search history.

(56) References Cited

U.S. PATENT DOCUMENTS

| 3,035,637 A | 5/1962 | Allen |
| 3,316,965 A | 5/1967 | Watanabe |
| 3,319,712 A | 5/1967 | O'Brien |
| 3,368,627 A | 2/1968 | Hurst et al. |
| 4,490,985 A | 1/1985 | Wells |
| 4,511,381 A | 4/1985 | Mehra |

(Continued)

FOREIGN PATENT DOCUMENTS

| DE | 102014010105 A1 | 1/2016 |
| FR | 2466606 A1 | 4/1981 |

(Continued)

OTHER PUBLICATIONS

International Search Report and Written Opinion dated May 10, 2017, corresponding to Application No. PCT/US2016/063127.

(Continued)

*Primary Examiner* — Brad Harcourt
(74) *Attorney, Agent, or Firm* — Patterson + Sheridan, LLP

(57) ABSTRACT

A fluid recovery system includes a separator configured to separate a hydrocarbon stream into an unfractionated mixture, water, and natural gas. The system further includes a storage vessel in communication with the separator and configured to store the unfractionated mixture separated from the hydrocarbon stream. The system further includes a compressor in communication with the separator and configured to pressurize the natural gas.

10 Claims, 1 Drawing Sheet

(56) References Cited

U.S. PATENT DOCUMENTS

| | | | |
|---|---|---|---|
| 4,576,005 | A | 3/1986 | Force |
| 4,617,030 | A * | 10/1986 | Heath ............... E21B 43/34 95/158 |
| 6,230,814 | B1 | 5/2001 | Nasr et al. |
| 6,347,675 | B1 * | 2/2002 | Kolle ............... C09K 8/38 175/205 |
| 7,373,790 | B2 | 5/2008 | Clare et al. |
| 8,505,332 | B1 | 8/2013 | Prim |
| 8,844,639 | B2 | 9/2014 | Gupta et al. |
| 8,869,889 | B2 | 10/2014 | Palmer et al. |
| 9,488,040 | B2 | 11/2016 | Chakrabarty et al. |
| 9,534,836 | B2 | 1/2017 | Dubettier-Grenier et al. |
| 2003/0056535 | A1 * | 3/2003 | Beam ............... F17C 7/00 62/613 |
| 2005/0189112 | A1 | 9/2005 | Taylor et al. |
| 2006/0289166 | A1 | 12/2006 | Stromquist et al. |
| 2007/0000666 | A1 | 1/2007 | Vozniak et al. |
| 2007/0187340 | A1 | 8/2007 | Oresti et al. |
| 2008/0017369 | A1 * | 1/2008 | Sarada ............... E21B 43/40 166/244.1 |
| 2008/0087041 | A1 | 4/2008 | Denton et al. |
| 2012/0000660 | A1 | 1/2012 | Gatlin et al. |
| 2012/0047942 | A1 | 3/2012 | Kolodziej |
| 2013/0168086 | A1 | 7/2013 | Roberts |
| 2013/0213085 | A1 | 8/2013 | Ward |
| 2013/0220605 | A1 | 8/2013 | Vandor |
| 2013/0228330 | A1 | 9/2013 | Loree et al. |
| 2013/0299167 | A1 | 11/2013 | Fordyce et al. |
| 2014/0000899 | A1 | 1/2014 | Nevison |
| 2014/0124208 | A1 | 5/2014 | Loree et al. |
| 2014/0366577 | A1 | 12/2014 | Zubrin et al. |
| 2015/0021022 | A1 | 1/2015 | Ladva et al. |
| 2015/0152318 | A1 | 6/2015 | Travis |
| 2015/0167550 | A1 | 6/2015 | Vandervort et al. |
| 2015/0184932 | A1 | 7/2015 | Higginbotham et al. |
| 2015/0233222 | A1 | 8/2015 | Teklu et al. |
| 2015/0368566 | A1 | 12/2015 | Young et al. |

FOREIGN PATENT DOCUMENTS

| | | |
|---|---|---|
| GB | 2219818 A | 12/1989 |
| WO | 2010025540 A1 | 3/2010 |
| WO | 2012097424 A1 | 7/2012 |
| WO | 2015020654 A1 | 2/2015 |
| WO | 2016064645 A1 | 4/2016 |

OTHER PUBLICATIONS

International Search Report and Written Opinion dated May 10, 2017, corresponding to Application No. PCT/US2016/063132.

International Invitation to Pay Additional Fees and, Where Applicable, Protest Fee dated Feb. 13, 2017, Corresponding to Application No. PCT/US2016/063127.

Rassenfoss; "In Search of the waterless fracture", JPT, Jun. 30, 2013, pp. 46-54, XP055237780.

M. Asadi et al., "Water-Free Fracturing: A Case History", Society of Petroleum Engineers, SPE-175988-MS, 14 Pages.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Nakashima et al., "SPE-177801-MS Development of a Giant Carbonate Oil Field, Part 2: Mitigation from Pressure Maintenance Developement to Sweep Oriented IOR Development", https://www.onepetro.org/download/conference-paper/SPE-177801-MS?id=conference-paper/SPE-177801-MS, pp. 1-8 and 12-16, Jan. 1, 2015.

Qing Sun et al., "Quantification of uncertainty in recovery efficiency predictions: lessons learned from 250 mature carbonate fields", SPE 84459, pp. 1-15, Jan. 1, 2005.

Holtz et al., "Summary Integrated Geologic and Engineering Determination of Oil—Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_4159.pdf, pp. 1,5; table 2, Jan. 1, 1992.

* cited by examiner

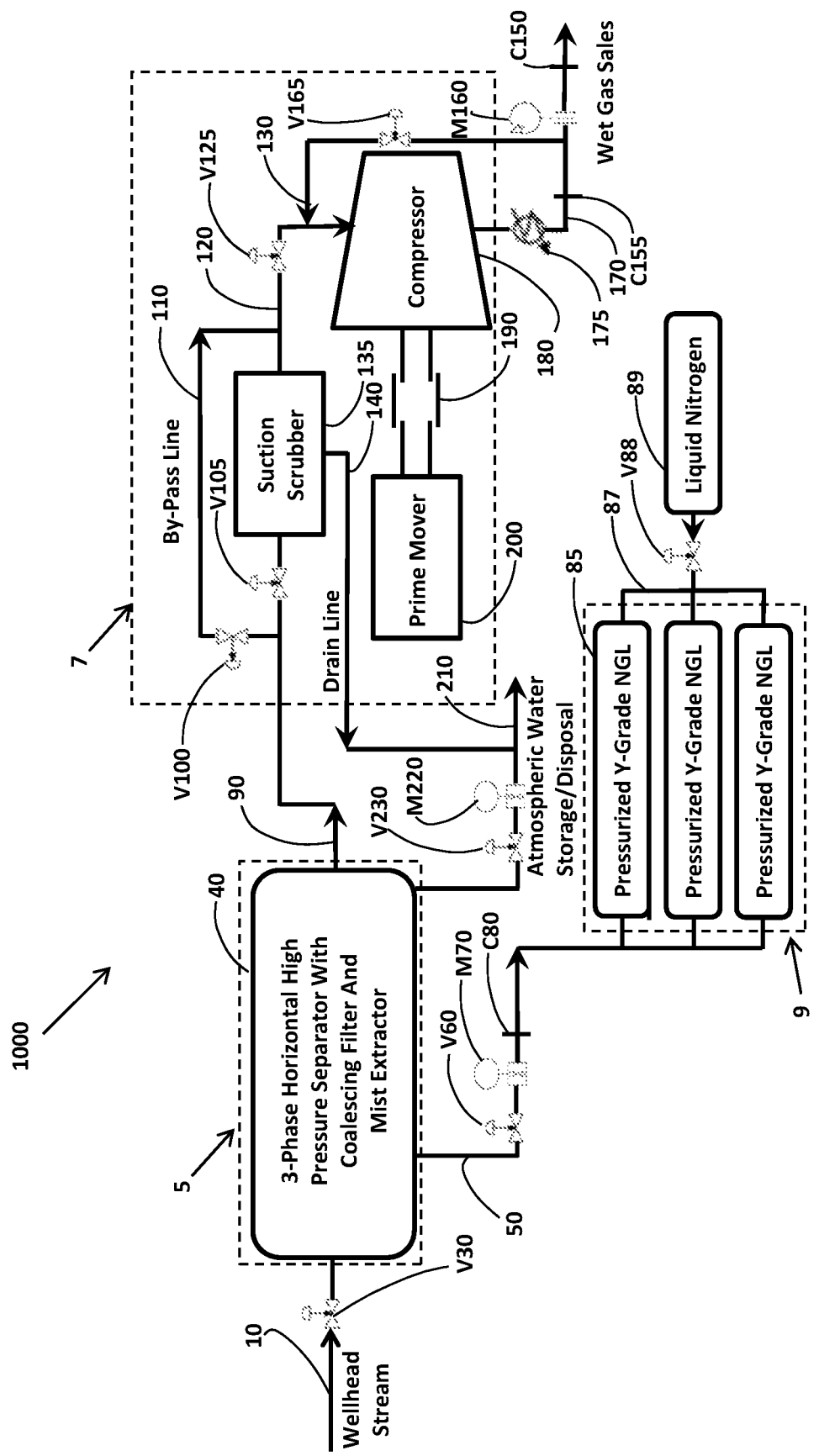

US 10,612,357 B2

Y-GRADE NGL RECOVERY

CROSS REFERENCE TO RELATED APPLICATIONS

This application claims benefit of U.S. Provisional Patent Application Ser. No. 62/289,722, filed Feb. 1, 2016, and U.S. Provisional Patent Application Ser. No. 62/319,877 filed Apr. 8, 2016, the contents of which are herein incorporated by reference in their entirety.

BACKGROUND

Field

Embodiments of this disclosure generally relate to a recovery system for Y-Grade NGL.

Description of the Related Art

Hydraulic fracture treatments are utilized to stimulate and improve fluid conductivity between a wellbore and a formation of interest to increase fluid production rate and associated reserves. Recent data suggests that approximately 98% of the hydraulic fracture treatments in the U.S. utilize water-based stimulation fluids (also referred to as fracing fluids). Water-based fracing fluids have associated acquisition, disposal, clean-up, and usage issues that can damage the formation and require chemical additions. Massive hydraulic fracture treatments traditionally use 100,000 barrels of water or more.

Therefore, there is a need for new stimulation fluids that are non-damaging to the formation, have minimal water content and chemical additions, are naturally occurring with locally available components, have fast clean-up, are cost effective, and are totally recoverable with minimal proppant flow back.

SUMMARY

In one embodiment, a fluid recovery system comprises a separator configured to separate a hydrocarbon stream into an unfractionated mixture, water, and natural gas; a storage vessel in communication with the separator and configured to store the unfractionated mixture separated from the hydrocarbon stream; and a compressor in communication with the separator and configured to pressurize the natural gas.

In one embodiment, a method of recovering a fluid comprises transporting a recovery system to a wellsite; connecting the recovery system to a hydrocarbon stream produced from the wellsite; and separating an unfractionated mixture from the hydrocarbon stream at the wellsite.

In one embodiment, a method of recovering a fluid comprises receiving a hydrocarbon stream from one or more wells at a wellsite; separating an unfractionated mixture from the hydrocarbon stream at the wellsite, wherein the unfractionated mixture comprises ethane, propane, butane, isobutane, and pentane plus; and storing the unfractionated mixture at the wellsite.

BRIEF DESCRIPTION OF THE DRAWING

So that the manner in which the above recited features can be understood in detail, a more particular description of the embodiments briefly summarized above may be had by reference to the embodiment below, some of which are illustrated in the appended drawing. It is to be noted, however, that the appended drawing illustrate only typical embodiments and are therefore not to be considered limiting of its scope, for the embodiments may admit to other equally effective embodiments.

FIG. 1 shows a plan schematic of a mobile Y-Grade NGL recovery system according to one embodiment.

DETAILED DESCRIPTION

Y-Grade natural gas liquids (referred to herein as Y-Grade NGL) is an un-fractionated hydrocarbon mixture comprising ethane, propane, butane, isobutane, and pentane plus. Pentane plus comprises pentane, isopentane, and/or heavier weight hydrocarbons, for example hydrocarbon compounds containing at least one of C5 through C8+. Pentane plus may include natural gasoline for example.

Typically, Y-Grade NGL is a by-product of de-methanized hydrocarbon streams that are produced from shale wells and transported to a centralized facility. Y-Grade NGL can be acquired from a splitter facility, a gas plant, a refinery, and/or from an operator's oil & gas production facility and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-12 percent, to allow the Y-Grade NGL to be transported as a liquid in low pressure storage vessels. According to another example, Y-Grade NGL may be processed to have a high ethane content, such as an ethane content within a range of 38-60 percent, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, a refinery, and/or from an operator's oil & gas production facility. A further difference is that LPG is a pure product with the exact same composition, whereas Y-Grade NGL can have a variable composition.

A mobile high pressure separation and compression system (such as recovery system 1000 shown in FIG. 1) can be utilized to recover Y-Grade NGL from an individual well or from a comingled hydrocarbon stream from several unconventional wells located on a common pad at a wellsite of an oil and gas lease. It is economically attractive to recover and to use the Y-Grade NGL from the same oil and gas lease as it eliminates the requirements for the operator to pay mineral royalties and state taxes in most states.

The high pressure mobile separation and compression system is comprised of a three-phase horizontal separator and one or more compressors (such as a natural gas compressor). The three-phase horizontal separator is operated at a specific pressure and temperature to recover a unique composition of Y-Grade NGL that can be stored, transported under pressure, and utilized as a stimulation fluid, such as a hydraulic fracturing fluid and/or an enhanced oil recovery fluid. The compressor is utilized to re-pressurize the residual natural gas stream from the three-phase horizontal separator to satisfy offtake wet gas sales pipeline requirements.

FIG. 1 shows a plan schematic of a mobile Y-Grade NGL recovery system 1000 according to one embodiment that can be used to create and recover Y-Grade NGL from a wellhead hydrocarbon stream 10 at a wellsite. The Y-Grade NGL recovery system 1000 is transported to the wellsite and connected to the hydrocarbon stream 10 (produced from one or more wells at the wellsite) via an inlet of a three-phase high pressure horizontal separator 40 with operating pressure and throughput rate controlled by control valve V30. The hydrocarbon stream 10 is separated by the separator 40 into three unique components including Y-Grade NGL, water, and natural gas via gravity segregation at a specified pressure and temperature.

Pressurized Y-Grade NGL exits the separator 40 via transfer line 50 that is controlled by control valve V60 and rate metered by turbine meter M70 to pressurized Y-Grade NGL storage vessels 85. Check valve C80 prevents back flow from the Y-Grade NGL storage vessels 85. The Y-Grade NGL storage vessels 85 are nitrogen blanketed by a nitrogen blanketing system comprising a nitrogen header 87, control valve V88, and liquid nitrogen storage tank 89. Liquid nitrogen from the storage tank 89 is discharged through the control valve V88 to the nitrogen header 87, which distributes nitrogen into the Y-Grade NGL storage vessels 85. The Y-Grade NGL can subsequently be used as a stimulation fluid in the form of a foam, a gel, and/or an emulsion, and injected into a hydrocarbon-bearing reservoir (such as through the same well that the hydrocarbon stream 10 was produced) to stimulate and/or fracture the reservoir.

Water from the separator 40 is transferred via line 210 to an atmospheric water storage and/or disposal facility on the oil and gas leases for example. The flow rate and pressure of the water from the separator 40 is controlled by control valve V230 and metered by turbine meter M220.

Natural gas from the separator 40 is transferred via line 90 through control valve V105 and into a suction scrubber 135. Entrained liquids are removed from the natural gas stream by the suction scrubber 135 and transferred to the atmospheric water storage and/or disposal facility via drain line 140. The suction scrubber 135 can be by-passed by opening control valve V100, closing control valve V105, and allowing the natural gas stream to move through line 110.

A liquid free natural gas stream exits the suction scrubber 135 via line 120, flows through control valve V125, and is suctioned into a compressor 180. Although only one compressor 180 is shown, the Y-Grade NGL recovery system 1000 may include two or more compressors 180.

The compressor 180 is driven by a prime mover 200 via a power transfer coupling 190 to pressurize the natural gas stream. The high pressure natural gas stream exits the compressor 180, is cooled by an aftercooler 175, flows through check valve C155, and is metered by an orifice meter M160 before transferring to a wet gas sales line (which may also have check valve C150) via transfer line 170. Potential surging of the high pressure natural gas stream flowing through the transfer line 170 is controlled by a control valve V165 and line 130, which directs the high pressure natural gas stream back to line 120 upstream of the compressor 180.

In one embodiment, the mobile Y-Grade NGL recovery system 1000 can be connected to an individual unconventional well or multi-well production facility on an oil and gas lease and located in a designated area classified as Class 1 Division 1 or Division 2 to recover Y-Grade NGL and to store the Y-Grade NGL for later use in hydraulic fracturing operations.

In one embodiment, the mobile Y-Grade NGL recovery system 1000 and/or the three-phase high pressure horizontal separator 40 is attached to a portable skid-frame 5. An example of the separator 40 is a forty inch diameter by ten foot in length carbon steel vessel with a maximum working pressure of 1,440 psig and a liquid and gas capacity of 10,000 barrels of fluid per day and 45 million of cubic feet per day of natural gas, respectively. The inlet of the separator 40 is four inches, the Y-Grade NGL outlet of the separator 40 is three inches, the water outlet of the separator 40 is two inches, and the natural gas stream outlet of the separator 40 is three inches, all with ANSI 600 rating. The separator 40 is fitted with a deflector, weir, coalescing plates/filters, a mist extractor, and other safety devices.

In one embodiment, the mobile Y-Grade NGL recovery system 1000 and/or the natural gas compressor 180 driven by the prime mover 200 is attached to a portable skid-frame 7. An example of the compressor 180 and the prime mover 200 is a reciprocating compressor (or a centrifugal compressor) driven by an electric motor, respectively. A gas turbine powered by the wet gas sales stream can be used to power the prime mover 200. The prime mover 200 can also comprise a natural gas fueled engine. The compressor 180 is typically equipped with a suction scrubber, an anti-surge loop, a throttle valve, a shutdown, a speed control, and other safety systems. The typical suction pressure of the compressor 180 would range between 100-230 psig to 250-500 psig, while the typical discharge pressure of the compressor 180 would range between 600 psig to 1,000-1,500 psig.

In one embodiment, the mobile Y-Grade NGL recovery system 1000 and/or the suction scrubber 135 is attached to the portable skid-frame 7. The suction scrubber 135 is configured to remove entrained liquids and solids from the natural gas stream (that exits from the separator 40) and is typically equipped with replaceable filter elements.

In one embodiment, the mobile Y-Grade NGL recovery system 1000 and/or the Y-Grade NGL storage vessels 85 are attached to a portable skid-frame 9. An example of a Y-Grade NGL storage vessel 85 is a carbon steel bullet shaped shell with a capacity of 30,000-100,000 gallons rated to a maximum working pressure of 250-500 psig equipped with ANSI 600 fittings.

In one embodiment, the mobile Y-Grade NGL recovery system 1000 and/or the nitrogen blanketing system is attached to a portable skid-frame. The nitrogen blanketing system can inject liquid nitrogen into the Y-Grade NGL storage vessels 85. In one embodiment, the Y-Grade NGL in the storage vessels 85, 350 can be injected into a reservoir (through the same or a different well from which the hydrocarbon stream 10 was produced, as well as into the same or a different reservoir from which the hydrocarbon stream 10 was produced) to conduct a stimulation operation on the reservoir, such as a fracturing or enhanced oil recovery operation.

In one embodiment, one or more components of the Y-Grade NGL recovery system 1000 or the entire Y-Grade NGL recovery system 2000 can be affixed to a portable skid-frame and transported to a wellsite. In one embodiment, different portions of the Y-Grade NGL recovery system 1000 can be affixed to portable skid-frames (such as skid-frames 5, 7, 9 shown in FIG. 1), transported to a wellsite, and flanged together at the wellsite to form the entire Y-Grade NGL recovery system 1000. Although described as a mobile Y-Grade NGL recovery system 1000, one or more components of the system 1000 (or the entire system 1000) may be permanently affixed at a wellsite. In one embodiment, one or more components of the Y-Grade NGL recovery system 1000 can be remotely monitored during operation to monitor system performance.

Cost Comparison Example

The following shows the cost of recovering Y-Grade NGL from the mobile Y-Grade NGL recovery system 1000 located on the same oil and gas lease that the Y-Grade NGL will be used as a stimulation fluid for hydraulic fracturing operations. A comparison is made to the cost of purchasing Y-Grade NGL from a local gas splitter or gas plant, and trucking the Y-Grade NGL to the oil and gas lease storage vessels where hydraulic fracturing operations will be conducted.

In both scenarios, 300,000 gallons of Y-Grade NGL is acquired for an oil and gas lease where a recently drilled unconventional well is waiting hydraulic fracturing.

In the first scenario, the mobile Y-Grade NGL recovery system 1000 is transferred to and mobilized on the oil and gas lease. Y-Grade NGL is recovered from production from the existing wells by connecting the inlet of the three-phase high pressure horizontal separator 40 to the inlet of a wellhead header from where the wellhead hydrocarbon stream 10 begins. It is assumed the Y-Grade NGL recovered from the lease using the Y-Grade NGL recovery system 1000 will be approximately 1,000 bbls per day, and that the Y-Grade NGL recovery system 1000 can be leased for $5,000 per day plus fuel/power costs.

In the second scenario, Y-Grade NGL is purchased from a splitter facility at a commodity hub price of $19/bbl and transported by tanker truck to the oil and gas lease for storage.

A comparison of the two scenarios is shown by Table 1.

TABLE 1

| | Scenarios | |
|---|---|---|
| | 300,000 gallons from Y-Grade NGL Recovery System | 300,000 gallons from Y-Grade NGL Splitter Facility |
| Y-Grade NGL Cost Current Price - $19/bbl | N/A | $135,700 |
| Trucking Costs from Splitter Facility to Lease - $2.00/bbl | N/A | $14,200 |
| Y-Grade NGL Recovery System Lease cost 7 days | $35,000 | N/A |
| Y-Grade NGL Recovery System Power Costs - $300/day for 7 days | $2,100 | N/A |
| Total Costs | $37,100 | $149,900 |

The invention claimed is:

1. A method of recovering a fluid, comprising:
    transporting a recovery system to a wellsite;
    connecting the recovery system to a wellhead at the wellsite;
    recovering a hydrocarbon stream from a hydrocarbon bearing reservoir via the wellhead, wherein the hydrocarbon stream has not been previously injected into the hydrocarbon bearing reservoir;
    separating natural gas from the hydrocarbon stream at the wellsite;
    separating an unfractionated hydrocarbon liquid mixture from the hydrocarbon stream at the wellsite, wherein the unfractionated hydrocarbon liquid mixture is a by-product of the hydrocarbon stream from which the natural gas has been separated and comprises ethane, propane, butane, isobutane, and pentane plus; and
    injecting the unfractionated mixture into the same or a different hydrocarbon bearing reservoir.

2. The method of claim 1, further comprising storing the unfractionated hydrocarbon liquid mixture in a storage vessel of the recovery system.

3. The method of claim 1, further comprising separating water from the hydrocarbon stream at the wellsite.

4. The method of claim 1, further comprising pressurizing the natural gas at the wellsite.

5. A method of recovering a fluid, comprising:
    receiving a hydrocarbon stream from one or more hydrocarbon bearing reservoirs at a wellsite, wherein the hydrocarbon stream has not been previously injected into the hydrocarbon bearing reservoir;
    separating natural gas from the hydrocarbon stream at the wellsite;
    separating an unfractionated hydrocarbon liquid mixture from the hydrocarbon stream at the wellsite, wherein the unfractionated hydrocarbon liquid mixture is a by-product of the hydrocarbon stream from which the natural gas has been separated and comprises ethane, propane, butane, isobutane, and pentane plus; and
    injecting the unfractionated hydrocarbon liquid mixture into the same or a different hydrocarbon bearing reservoir.

6. The method of claim 5, further comprising storing the unfractionated hydrocarbon liquid mixture in a pressurized storage vessel.

7. The method of claim 5, further comprising separating water from the hydrocarbon stream at the wellsite.

8. The method of claim 5, further comprising pressurizing the natural gas at the wellsite.

9. The method of claim 5, further comprising storing the unfractionated hydrocarbon liquid mixture at the wellsite.

10. The method of claim 5, further comprising transporting a separator on a portable skid-frame to the wellsite to separate the unfractionated hydrocarbon liquid mixture from the hydrocarbon stream.

* * * * *